United States Patent [19]

Manabe et al.

[11] 4,049,789
[45] Sept. 20, 1977

[54] PROCESS FOR PREPARATION OF MIXED OXIDE POWDERS

[75] Inventors: Toshikatsu Manabe, Ohme; Masao Ohta, Kure; Tetsuichi Kudo, Tokyo; Shouji Mochizuki, Hachioji; Tetsuo Gejyo, Tokyo, all of Japan

[73] Assignees: Hitachi, Ltd.; Babcock-Hitachi K.K., both of Tokyo, Japan

[21] Appl. No.: 588,901

[22] Filed: June 20, 1975

[30] Foreign Application Priority Data

July 10, 1974  Japan .................. 49-78314

[51] Int. Cl.$^2$ ............ C01G 49/00; C01F 17/00; C01G 23/00
[52] U.S. Cl. ............................... 423/593; 252/62.9; 252/62.56; 252/518; 252/519; 252/520; 252/521; 423/213.2; 423/594; 423/598; 423/239; 423/351; 423/600; 423/263
[58] Field of Search ............. 423/593, 598, 600, 594, 423/263; 252/62.56, 62.9, 518–521, 521.2

[56] References Cited

U.S. PATENT DOCUMENTS

| | | | |
|---|---|---|---|
| 2,974,008 | 3/1961 | Howatt | 423/598 |
| 3,305,349 | 2/1967 | Bovarnick et al. | 423/593 |
| 3,352,632 | 11/1967 | Sasaki | 423/598 |
| 3,484,376 | 12/1969 | Paris et al. | 252/62.9 |
| 3,542,685 | 11/1970 | Iwase et al. | 252/62.56 |
| 3,645,672 | 2/1972 | Cowland | 252/62.56 |
| 3,658,468 | 4/1972 | Cowland et al. | 252/62.56 |
| 3,708,438 | 1/1973 | Levy | 423/593 |
| 3,751,366 | 8/1973 | Bomar et al. | 423/594 |
| 3,873,461 | 3/1975 | Mollard et al. | 252/62.56 |

Primary Examiner—Herbert T. Carter
Attorney, Agent, or Firm—Birch, Stewart, Kolasch and Birch

[57] ABSTRACT

Nitric acid is added to an aqueous solution of organic acid salts of metals to be included in a resulting complex oxide powder, into which an aqueous solution of an inorganic salt of other metal component has been incorporated according to need, and the resulting solution is heated until the organic acid salts are decomposed and the decomposition product is heated, whereby a intended complex powder which is very fine and highly bulky and has a large specific surface area is obtained.

5 Claims, 1 Drawing Figure

PROCESS FOR PREPARATION OF MIXED OXIDE POWDERS

BACKGROUND OF THE INVENTION

1. Field of the Invention:

The present invention relates to a process for the preparation of complex oxide powders which are used broadly as catalysts, gas electrodes and the like. More particularly, the present invention relates to a process for the preparation of mixed oxide powders which are very fine and highly bulky and have a large specific surface area.

2. Brief Description of the Prior Art:

A material composed of at least two metal oxides is generally called a complex oxide. Materials formed by merely mixing metal oxides cannot be used as catalysts or gas electrode but only materials in which these metal oxides form a solid solution can be applied to these uses. In the case of a solid solution, a stoichiometric relation is established among the numbers of the constituent metals and oxygen. By the term "complex oxide" used in the instant specification is meant an oxide including at least two metals as the constituent elements in which these metal oxides form a solid solution.

Various useful complex oxides are known in the art. For example, a material represented by the following general formula:

$$Ln_{2+x}M'_xCu_{1+y}M''_yO_4$$

wherein M' stands for Y, Ln is at least one element selected from rare earth elements having an atomic number of 59 to 71 and alkaline earth metals, M'' is at least one element selected from Li, Al, Ti, V, Cr, Mn, Fe, Co, Ni, Zn, Ga, Zr, Sn, Ce, Mo and W, and x and y are numbers satisfying the requirements $0 \leq x \leq 2$ and $0 \leq y \leq 1$, is a mixed oxide having a $K_2MgF_4$ crystal structure, and this material has very excellent properties as a catalyst for disposal of exhaust gases.

Further, it is known that a material represented by the following general formula:

$$M_{1+x}M''_xM'''_{3+y}$$

wherein A is at least one element selected from Y and rare earth elements having an atomic number of 57 to 71, M'' is at least one element selected from alkaline earth metals, M''' is at least one element selected from transition metal elements, and x and y are numbers satisfying the requirements $0 \leq x \leq 1$ and $0 \leq y \leq 0.5$; is a complex oxide having a perovskite crystal structure, and a porous electrode formed by using this material has very excellent properties.

As typical instances of other well-known complex oxides, there can be mentioned ferrite, garnet, lead zirconate, lead titanate, barium titanate, and lead zircotitanate.

These various complex oxides are used broadly in various fields.

Complex oxides have heretofore been prepared ordinarily by the coprecipitation method, the freeze-drying method and other methods.

According to the coprecipitating method, constituent metal elements are coprecipitated from a solution of salts of metal elements of an intended complex oxide such as nitrates, acetates, oxalates and chlorides, and the coprecipitate is separated from the liquid and heat-decomposed, and the decomposition product is heated so as to obtain the intended complex oxode powder having a uniform composition.

This is one of methods heretofore used most frequently for the preparation of complex oxide powder, but this method is defective in that various additional steps such as the step of washing the coprecipitate are required and the bulkiness of the resulting complex oxide powder is low and the specific surface area is small.

According to the freeze-drying method, the temperature of a solution of salts of the constituent metal elements such as mentioned above is rapidly lowered to freeze the solvent and separate the salts from the solvent in vacuum, and the separated salts are heated as in the coprecipitation method.

This method is advantageous in that a complex oxide powder having a very large specific surface area can be obtained, but the method is defective in that the process steps are complicated and the bulkiness of the resulting complex oxide powder is low. Accordingly, the application of this method is limited.

Furthermore, there have been proposed a method comprising mixing uniform powders of salts of the constituent metal elements and heating the resulting homogeneous mixture and a method comprising evaporating a solution of salts such as mentioned above to dryness to separate the salts from the solvent. However, these methods are defective in that the process steps are complicated and the properties of the resulting complex oxide powder are undesirable. None of these conventional methods are satisfactory from the industrial viewpoint.

SUMMARY OF THE INVENTION

It is therefore a primary object of the present invention to provide a process for the preparation of complex oxide powders which can overcome the above-mentioned various defects involved in the conventional methods and according to which complex oxide powder which are fine and bulky and have a large specific surface area can be efficiently prepared.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In accordance with the present invention, this object can be attained by a process comprising adding nitric acid to a solution of organic acid salts of constituent metals of an intended mixed oxide, heating the solution until the organic acid salts are decomposed, and heating the resulting decomposition product to form the intended complex oxide powder having a uniform composition.

BRIEF DESCRIPTION OF THE DRAWING

The present invention will become more fully understood from the detailed description given hereinbelow and the accompanying drawings which are given by way of illustration only, and thus are not limitative of the present invention, and wherein.

Figure 1:
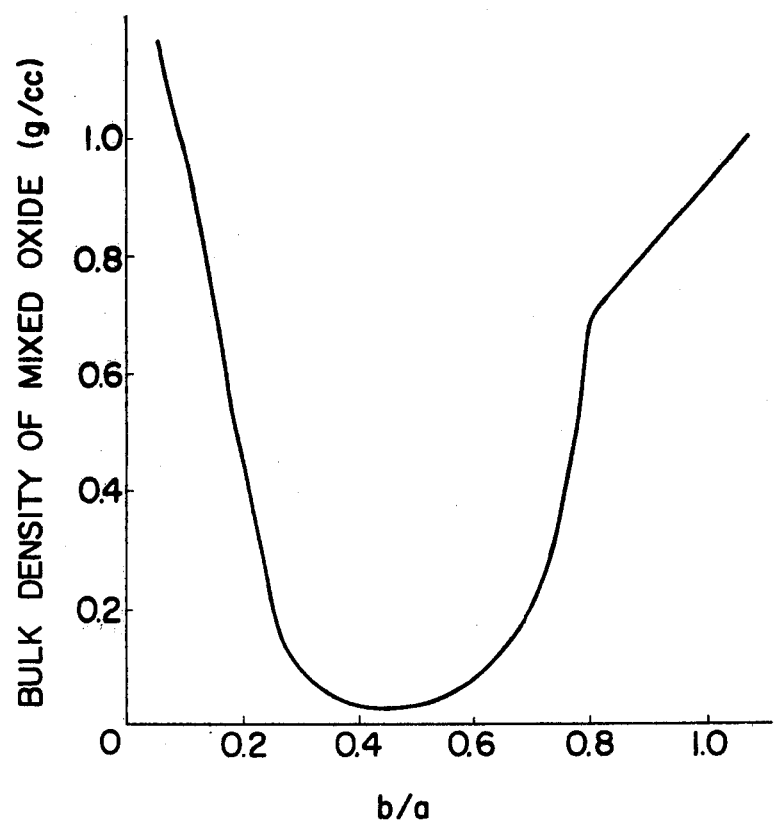
FIG. 1 is a curve illustrating the relationship between the amount of nitric acid added and the bulk density of the resulting complex oxide powder.

DESCRIPTION OF THE PREFERRED EMBODIMENTS:

Complex oxides powder are prepared from a solution of organic or inorganic salts of constituent metal elements by the above-mentioned various methods.

One of the characteristic features of the present invention over the conventional methods is that a solution is used in which at least one of the constituent metal elements is present in the form of an organic acid salt, nitric acid is added to the solution and the solution is heated to oxidize and decompose the organic acid salt. As organic acid salts of metal elements, there can be used, for example, various water-soluble salts of organic acids such as acetic acid, formic acid, butyric acid, citric acid and tartaric acid.

Nitric acid is added to an aqueous solution of such organic acid salts, and the solution is heated. When water is substantially evaporated to dryness, decomposition of organic substances begins. In this state, nitric acid copresent with the organic acid salts is also decomposed, and oxygen is generated by decomposition of nitric acid and by a highly oxidative action of oxygen of the nascent state the oxidative decomposition of the organic acid salts is further promoted.

The so obtained decomposition product of the organic acid salts is very fine and cohesion is substantially not caused among particles. Accordingly, the decomposition product is very bulky. This phenomenon is similarly observed not only when all of the starting metal elements are used in the form of organic acid salts but also when parts of the starting metal elements are used in the form of inorganic salts. More specifically, in practicing the process, all of the starting materials need not be organic acid salts but inorganic salts may also be used in combination with organic acid salts.

In the present invention, the decomposition rate of the salts is changed according to the amount of nitric acid added and this change in the decomposition rate results in the change of the particle size or the bulkiness in the resulting decomposition product. Therefore, according to the present invention it is possible to control the particle size or the bulkiness of the resulting complex oxide powder by adjusting the amount of nitric acid which is added in the process.

A preferred amount of nitric acid to be added is closely related with the amount of the organic acids contained in the organic acid salts. More specifically, when nitric acid is added to an aqueous solution of the organic acid salts, the organic acids contained in the organic acid salts are promptly replaced by nitric acid. However if the amount of nitric acid to be added at this point is too small, the organic acids are not sufficiently substituted for and the oxidative decomposition is not effectively advanced. In contrast, if the added amount of nitric acid is too large and the organic acids are completely substituted by nitric acid, it follows that the metal nitrates are heated and no preferred results can be obtained.

A fine powdery complex oxide having a very low bulk density and excellent properties can be obtained when nitric acid is added in such an amount that the ratio b/a is within a range of from 0.3 to 0.6 wherein a stands for the minimum amount (mole) of nitric acid necessary for completely substituting organic acids contained in organic acid salts of the constituent metal elements and b stands for the amount (mole) of nitric acid actually added.

A complex oxide powder obtained by adding nitric acid in such an amount that the ratio b/a is within a range of from 0.2 to 0.8 can be applied to the intended uses, but if the ratio b/a is outside the range of from 0.2 to 0.8, the bulk density of the resulting complex oxide powder drastically increases and it cannot be put into practical use.

When nitric acid is added in the foregoing manner and the solution of organic acid salts is heated substantially to dryness, the resulting decomposition product of the salts is a mixture of constituent metal elements and the like, and at this point no intended complex oxide powder is formed as yet. The intended complex oxide powder is obtained only when this decomposition product is heated. The decomposition product at the above heating step is very fine and possessed excellent homogeneity. Accordingly, heating can be accomplished at a lower temperature in a shorter time than in the conventional methods. Therefore, cohesion or growth of the particles is hardly caused at the heating step, and a complex oxide powder which is highly bulky and has a very large specific surface area is obtained. For example, a complex oxide powder having a composition $La_2Cu_{0.9}Zr_{0.1}O_4$ or $Nd_{0.9}Sr_{0.1}Co_{0.9}Ni_{0.1}O_3$ can be obtained by conducting the heating at about 700° C. for about 1 hour. Further, a complex oxide powder of the perovskite type crystal structure represented by the general formula $M'M''O_3$ in which A stands for a rare earth element such as La, Sm, Eu and Nd or an alkaline earth mtal such as Mg, Ca, Ba and Sr and M'' stands for Ni, Co or Fe and a mixed oxide of the $K_2MgF_4$ type crystal structure represented by the general formula $A_2BO_4$ in which M' and M'' are as defined above, can easily be formed by conducting the heating at a temperature lower than 1000° C. for about 1 hour.

When a complex oxide powder is formed from a mixture of oxides or acetates of constituent metal elements according to the conventional methods, the heating should be conducted at a high temperature exceeding 1000° C. for more than 24 hours for in order to obtain the intended complex oxide powder. According to the conventional methods, since the heating is conducted at such high temperatures, growth or cohesion of the particles is readily causes and hence, it is difficult to obtain a complex oxide powder having high bulkiness and a large specific surface area. Furthermore, in the conventional methods, when the heating is conducted at such high temperatures for a long time, incorporation of different oxides cannot be prevented and thus a complex oxide powder having a homogeneous composition cannot be obtained.

ACcording to the present invention, all of the defects of the conventional methods can be completely overcome. More specifically, in the process of the present invention, since the heating temperature can be lowered and the heating can be accomplished in a shorter period of time, a very fine complex oxide powder having a high bulkiness and a large specific surface area and possessing an excellent homogeneous composition can be obtained, and when the so obtained complex oxide powder is used for the production of gas diffusion electrodes and catalysts in which a high porosity and a large surface area are required, the resulting products show very excellent properties.

This invention will now be illustrated in detail by reference to the following Examples which by no means should limit the scope of the present invention.

EXAMPLE 1

15.8 g of lanthanum acetate, 5.0 g of copper acetate and 0.67 g of zirconium acetate were dissolved in 90 ml of pure water, and 15 ml of nitric acid having a specific gravity of 1.38 was added to the solution and it was heated substantially to dryness, to obtain a very bulky decomposition product. The so obtained decomposition product was heated in air at 900° C. for 2 hours to obtain a mixed oxide powder having a composition $La_2Cu_{0.9}Zr_{0.1}O_4$.

The obtained mixed oxide powder was found to have a specific surface area of 7 m²/g and a bulk density of 0.068 g/cm³.

A complex oxide powder of the same composition prepared according to the conventional coprecipitation method was found to have a specific surface area of 2 m²/g and a bulk density of 0.2 g/cm³. Thus, it was found that each of the specific surface area and the bulkiness of the oxide powder according to the process of the present invention was higher than that of the complex oxide powder prepared according to the conventional method.

The complex oxide powder $La_2Cu_{0.9}Zr_{0.1}O_4$ prepared by this Example was molded and used as a catalyst for reducing nitrogen oxides ($NO_x$) to nitrogen ($N_2$). The conversion of $NO_x$ to $N_2$ was as high as 90% when the specific velocity was 10,000 hr⁻¹. When a catalyst prepared by heating and molding the above-mentioned mixed oxide powder formed according to the coprecipitation method exhibited a conversion of only 83% under the same conditions. Thus, it was found that the catalyst prepared from the complex oxide powder formed according to the process of the present invention was excellent over the comparative catalyst prepared from the complex oxide powder formed according to the coprecipitation method.

EXAMPLE 2

15.80 g of neodymium acetate, 10.75 g of strontium acetate, 11.20 g of cobalt acetate and 1.20 g of nickel acetate were dissolved in 100 ml of pure water (composition 1).

In the same manner as described in Example 1, 7 to 15 ml of nitric acid having a specific gravity of 1.38 was added to the solution to decompose the above salts, and the decomposition product was heated at 900° C. for 1 hour to obtain a complex oxide powder of the perovskite crystal structure having a composition $Nd_{0.9}Sr_{0.1}Co_{0.9}Ni_{0.1}O_3$. The resulting complex oxide powder was molded into an air electrode.

A relation as shown in Table 1 was established between the amount of nitric acid added and the properties of the air electrode.

Table 1

| Added Amount (Ml) of Nitric Acid | Bulk Density (g/cm³) | Electrode Characteristic (V) |
|---|---|---|
| 7  | >0.2      | −0.25 |
| 10 | 0.1       | −0.21 |
| 12 | 0.1 − 0.08 | −0.18 |
| 13 | 0.07− 0.05 | −0.15 |
| 14 | 0.1       | −0.20 |
| 15 | >0.2      | −0.27 |

In Table 1, the electrode characteristic means the potential of the electrode when it was actuated at a current density of 50 mA/cm², which potential was measured by using a mercury reference electrode (Hg/HgO) as a reference electrode. A higher value is more preferred for the electrode.

As is apparent from the results shown in Table 1, it was found that when the amount of nitric acid added was 10 to 14 ml per 100 ml of the salt solution, the resulting complex oxide powder had a higher bulkiness and a better electrode characteristic.

In addition to the above aqueous solution containing the acetates alone (composition 1), solutions containing citrates or formates in combination with acetates (compositions 2 and 3 shown below) were treated in the same manner as the above composition 1 to obtain complex oxide powder. When they were molded into air electrodes and tested in the same manner as above, similar results were obtained

| | |
|---|---|
| Composition 2: | |
| $Nd(CH_3COO)_3$ | 15.800 g |
| $Sr(CH_3COO)_2$ | 1.075 g |
| $Co_3(C_6H_5O_7)_2$ | 17.843 g |
| $Ni_3(C_6H_5O_7)_2$ | 1.980 g |
| Composition 3: | |
| $Nd(CH_3COO)_3$ | 15.800 g |
| $Sr(CH_3COO)_2$ | 1.075 g |
| $Co(HCOO)_2$ | 13.409 g |
| $Ni(HCOO)_2$ | 1.488 g |

EXAMPLE 3

A preferred amount of nitric acid to be added is closely concerned with the amount of organic acids contained in organic acid salts of constituent metal elements. More specifically, when nitric acid is added to an aqueous solution of organic acid salts, the organic acids contained in the salts are immediately substituted by nitric acid, and if the amount of nitric acid added is too small or too large compared to the amount of the organic acids to be substituted, complex oxide powder having preferred properties cannot be obtained.

FIG. 1 illustrates the results obtained when the complex oxide powder were prepared by adding nitric acid to an aqueous solution containing 0.5 mole/l of $La(CH_3COO)_3$, 0.1125 mole/l of $Cu(CH_3COO)_2$ and 0.025 mole/l of $ZrO(NO_3)_2 \cdot 2H_2O$ and influences of the amount of nitric acid added on the bulk density of the resulting complex oxide powder were examined.

As is apparent from the results shown in FIG. 1, when the ratio b/a of the added amount (b mole) of nitric acid to the minimum amount (a mole) necessary for substituting completely the organic acids contained in the organic acid salts is within a range of from 0.2 to 0.8, the bulk density of the heated complex oxide powder is sufficiently low, and products obtained by adjusting the ratio b/a within this range can be sufficiently put into practical use. Especially when the ratio b/a is within a range of from 0.3 to 0.6, the bulk density is drastically lowered and the resulting complex oxide powder possesses very excellent properties.

In the foregoing Examples, only complex oxide powder of the perovskite crystal structure and of the $K_2MgF_4$ type crystal structure are illustrated. However, the process of this invention can be applied to the production of other type mixed oxides, for example, ferrites and garnets and good results can be similarly obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for the preparation of complex oxide powder having a high specific surface area and a low bulk density which comprises the steps of preparing an aqueous solution of salts of the metallic elements of said complex oxide and nitric acid, said complex oxide being at least one member selected from the group consisting of complex oxides with perovskite crystal structure and complex oxides with $K_2MgF_4$ crystal structure, wherein said solution contains said metallic elements in the proportion of the constituent metallic elements of said complex oxide, at least one of said salts being an organic acid salt and said nitric acid being present in said solution in such an amount that a ratio $b/a$ is within a range of from 0.2 to 0.8, wherein a stands for the minimum molar amount of nitric acid necessary for completely substituting for the organic acid of said organic acid salt and $b$ stands for the molar amount of nitric acid actually added, heating said aqueous solution substantially to dryness to decompose said salts and heating the resulting decomposition product to form the intended complex oxide powder having a uniform composition.

2. A process of claim 1, wherein said organic acid is at least one member selected from the group consisting of acetic acid, citric acid, formic acid, taetaric acid and butyric acid.

3. A process of claim 1, wherein at least one inorganic salt is used in combination with said organic salt.

4. A process of claim 1, wherein the heating temperature of said resulting decomposition product is a temperature less than 1000° C.

5. A process of claim 1, wherein said ratio of b/a is within a range of from 0.3 to 0.6.

* * * * *